US006977793B2

(12) United States Patent
White et al.

(10) Patent No.: US 6,977,793 B2
(45) Date of Patent: Dec. 20, 2005

(54) MAGNETIC RECORDING DISK DRIVE WITH DUAL-STAGE ACTUATOR AND CONTROL SYSTEM WITH MULTIPLE CONTROLLERS

(75) Inventors: Matthew T. White, Mountain View, CA (US); Satoshi Yamamoto, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 159 days.

(21) Appl. No.: 10/802,601

(22) Filed: Mar. 16, 2004

(65) Prior Publication Data

US 2005/0207056 A1 Sep. 22, 2005

(51) Int. Cl.[7] .............................................. G11B 5/596
(52) U.S. Cl. ................................... 360/78.05; 360/61
(58) Field of Search ............................. 360/61, 78.05, 360/78.09, 69, 75

(56) References Cited

U.S. PATENT DOCUMENTS

| 5,936,805 A | 8/1999 | Imaino |
| 5,959,808 A | 9/1999 | Fan et al. |
| 6,611,399 B1 | 8/2003 | Mei et al. |

OTHER PUBLICATIONS

L.S. Fan et al., "Electrostatic Microactuator and Design Considerations for HDD Applications", IEEE Transactions on Magnetics, vol. 35, No. 2, Mar. 1999, pp. 1000–1005.
Y. Lou et al., "Dual–Stage Servo With On–Slider PZT Microactuator for Hard Disk Drives", IEEE Transactions on Magnetics, vol. 38, No. 5, Sep. 2002, pp. 2183–2185.
T. Semba et al., "Dual–stage servo controller for HDD using MEMS microactuator", IEEE Transactions on Magnetics, vol. 35, Sep. 1999, pp. 2271–2273.
M. T. White et al., "Use of the Relative Position Signal for Microactuators in Hard Disk Drives", Proceedings of the American Control Conference, Denver, Colorado, Jun. 4–6, 2003, pp. 2535–2540.

*Primary Examiner*—David Hudspeth
*Assistant Examiner*—Daniell L. Negrón
(74) *Attorney, Agent, or Firm*—Thomas R. Berthold (57) ABSTRACT

A disk drive with a dual-stage actuator has a servo control system with two controllers. One controller is a dual-stage controller that simultaneously generates a primary actuator control signal and a secondary actuator control signal, and uses a degraded-stability primary actuator controller design with high low-frequency open-loop gain and a secondary actuator controller design that provides stability and high mid-frequency to high-frequency open-loop gain resulting in increased bandwidth. The other controller is a single-stage controller that generates only a primary actuator control signal and uses a stable VCM-only controller design. The single-stage controller is selected if failure of the secondary actuator is detected. Failure of the secondary actuator is detected either by providing a model of the dynamic response of the primary and secondary actuators and comparing the modeled head-position with the measured head-position, or by measuring the position of the secondary actuator relative to the primary actuator with a relative-position sensor and comparing the relative position to a modeled position of the secondary actuator.

20 Claims, 10 Drawing Sheets

_MAGNETIC RECORDING DISK DRIVE WITH DUAL-STAGE ACTUATOR AND CONTROL SYSTEM WITH MULTIPLE CONTROLLERS_

TECHNICAL FIELD

This invention relates generally to magnetic recording hard disk drives, and more particularly to a disk drive with a dual-stage actuator for positioning the read/write heads.

BACKGROUND OF THE INVENTION

Magnetic recording hard disk drives use a servo-mechanical positioning system to move the read/write heads from one data track to another data track and to hold the heads on the tracks as required for read and write operations. Current hard disk drives use a rotary voice-coil-motor (VCM) as the single or primary actuator to position the read/write heads on the data tracks. Typically, each read/write head is attached to the end of a head carrier or air-bearing slider that rides on a cushion or bearing of air above the rotating disk. The slider is attached to a relatively flexible suspension that permits the slider to "pitch" and "roll" on the air bearing, with the suspension being attached to the end of the VCM actuator arm.

As magnetic recording technology improves, the data tracks are decreasing in width to accommodate more data in less space. This increase in track density increases the requirements on the servo control system to maintain the heads on the tracks in the presence of internal and external disturbances. This generally requires an increase in the servo bandwidth, accompanied with an increase in open-loop gain at the frequencies below the servo bandwidth. However, mechanical resonances limit the achievable servo bandwidth with the single-stage VCM actuator.

To address this problem, disk drives with dual-stage actuators have been proposed. Various types of secondary actuators, such as piezoelectric and electrostatic milliactuators and microactuators, have been proposed for location on the VCM actuator arm for driving the suspension, on the suspension between the suspension and the slider for driving the slider, or on the slider for driving just the read/write head. Generally, in the servo control scheme for a disk drive with a dual-stage actuator, the VCM is responsible for large-amplitude, low-frequency motion of the heads and the secondary actuator is responsible for small-amplitude, high-frequency motion of the heads. Because of the constraints on the location, size, mass, and frequency range of these secondary actuators, they have relatively small ranges of motion, on the order of a few microns. These limited ranges of motion of the secondary actuators impose constraints on the dual-stage servo controller design.

Generally, the design of a dual-stage controller starts with the VCM controller, typically with a design that is very similar to a single-stage VCM controller. In particular, the stability of the VCM is assured with adequate robustness or stability margins as if it were to operate without the secondary actuator. Then the controller for the secondary actuator is designed to achieve the desired combined dual-stage bandwidth. The secondary actuator control loop and the combined dual-stage control loop are also designed to ensure adequate stability separately and jointly with the other control loops. This process is satisfactory for limited increases in the bandwidth above what is achievable with only the VCM.

As the bandwidth is pushed to even higher frequencies, the limited stroke of the secondary actuator and the stability limits of the VCM control loop start to impact the overall servo design. Specifically, the low frequency gain of the combined open-loop frequency response may be lower than required for the higher bandwidth system. The primary actuator cannot be used to increase the low frequency gain because of the stability limitations associated with its mechanical resonances. The secondary actuator cannot be used to increase the low frequency gain due to its stroke limitations.

What is needed is a magnetic recording disk drive with a dual-stage actuator and a servo control system that has an open-loop low-frequency gain increase over single-stage designs comparable to the open-loop mid-to-high-frequency gain increase normally associated with dual-stage actuator designs.

SUMMARY OF THE INVENTION

The invention is a disk drive with a primary actuator, a secondary actuator mounted on the primary actuator, and a servo control system that has two controllers. One controller is a dual-stage controller that simultaneously generates a primary actuator control signal and a secondary actuator control signal, and uses a degraded-stability primary actuator controller design with high low-frequency open-loop gain and a secondary actuator controller design that provides stability and high mid-frequency to high-frequency open-loop gain resulting in increased bandwidth. The other controller is a single-stage controller that generates only a primary actuator control signal and uses a stable VCM-only controller design. Because failure of the secondary actuator would render the dual-stage actuator unstable and lead to loss of data and/or failure of the disk drive, the servo control system selects the single-stage controller if failure of the secondary actuator is detected. Failure of the secondary actuator is detected either by providing a model of the dynamic response of the primary and secondary actuators and comparing the modeled head-position with the measured head-position, or by measuring the position of the secondary actuator relative to the primary actuator with a relative-position sensor and comparing the relative position to a modeled position of the secondary actuator.

In one embodiment, the secondary actuator is an electrostatic microactuator located between the suspension and the slider and the relative position sensor is a capacitance sensing circuit coupled to the microactuator.

For a fuller understanding of the nature and advantages of the present invention, reference should be made to the following detailed description taken together with the accompanying figures.

DESCRIPTION OF THE INVENTION

1. Prior Art

Figure 1:
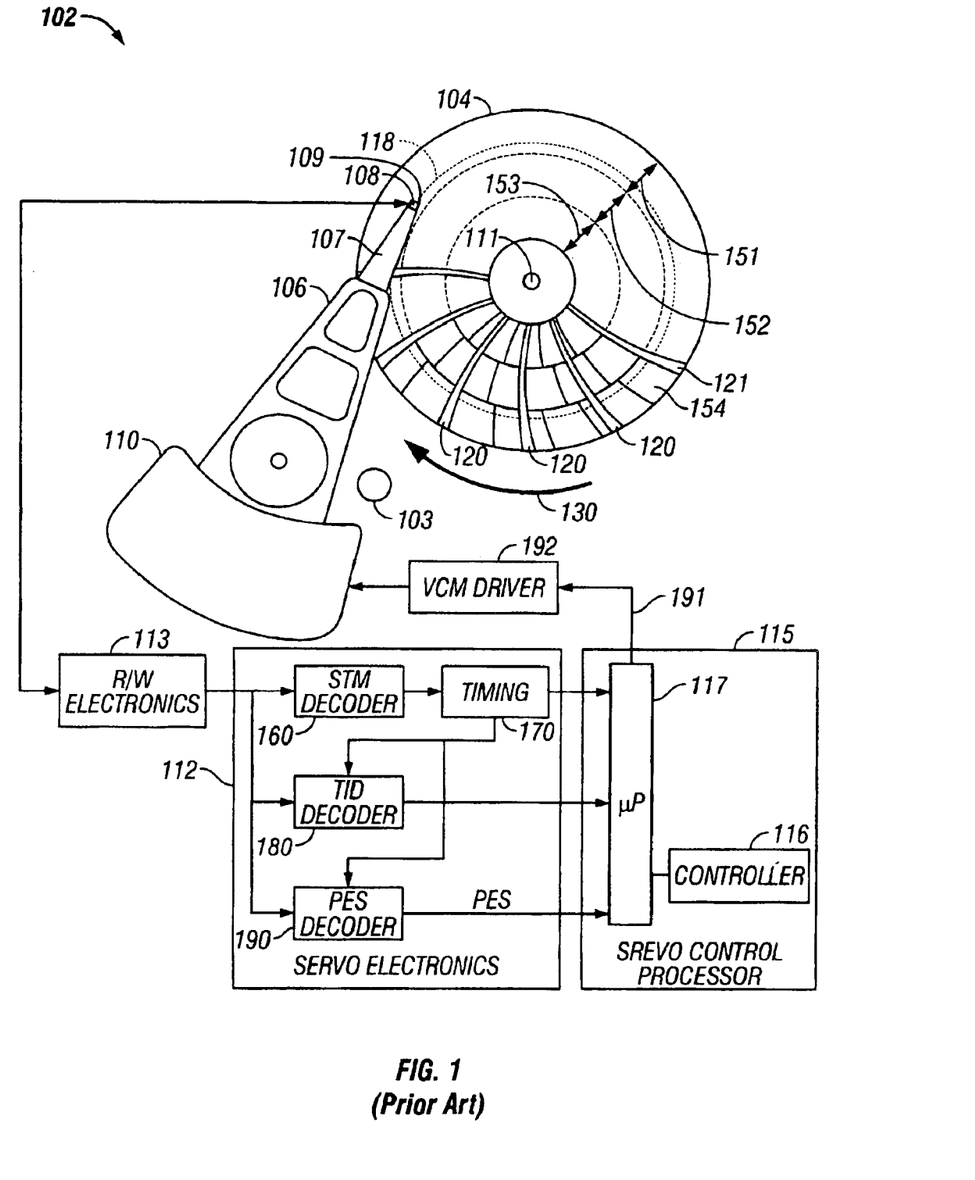
FIG. 1 is a block diagram of a prior art disk drive of the type usable with the present invention.

FIG. 1 is a block diagram of a conventional disk drive that uses sector servo and zone-bit recording (ZBR). The disk drive, designated generally as 102, includes data recording disk 104, a voice coil motor (VCM) 110 primary actuator, an inner-diameter crash stop 103 for the VCM 110, an actuator arm 106, a suspension 107, a head carrier or air-bearing slider 108, a data recording transducer 109 (also called a head, recording head or read/write head), read/write electronics 113, servo electronics 112, and servo control processor 115.

The recording head 109 may be an inductive read/write head or a combination of an inductive write head with a magnetoresistive read head and is located on the trailing end of slider 108. Slider 108 is supported on the actuator arm 106 by a suspension 107 that enables the slider to "pitch" and "roll" on an air-bearing generated by the rotating disk 104. Typically, there are multiple disks stacked on a hub that is rotated by a disk motor, with a separate slider and recording head associated with each surface of each disk.

Data recording disk 104 has a center of rotation 111 and is rotated in direction 130. Disk 104 is divided for head positioning purposes into a set of radially-spaced concentric tracks, one of which is shown as track 118. The disk drive in FIG. 1 is illustrated as a zonebit-recording (ZBR) disk drive because the tracks are grouped radially into a number of zones, three of which are shown as zones 151, 152 and 153, but the invention is fully applicable to a disk drive that does not use ZBR. Each track includes a plurality of circumferentially or angularly-spaced servo sectors. The servo sectors in each track are aligned circumferentially with the servo sectors in the other tracks so that they extend across the tracks in a generally radial direction, as represented by radially-directed servo sections 120. Each track has a reference index 121 indicating the start of track. Within each zone, the tracks are also circumferentially divided into a number of data sectors 154 where user data is stored. In the disk drive shown in FIG. 1, the data sectors contain no data sector identification (ID) fields for uniquely identifying the data sectors so the drive is considered to have a "No-ID"™ type of data architecture, also called a "headerless" data architecture, but the invention is fully applicable to a disk drive that uses headers to uniquely identify the data sectors. If the disk drive has multiple heads, then the set of tracks which are at the same radius on all disk data surfaces is referred to as a "cylinder".

Figure 2:
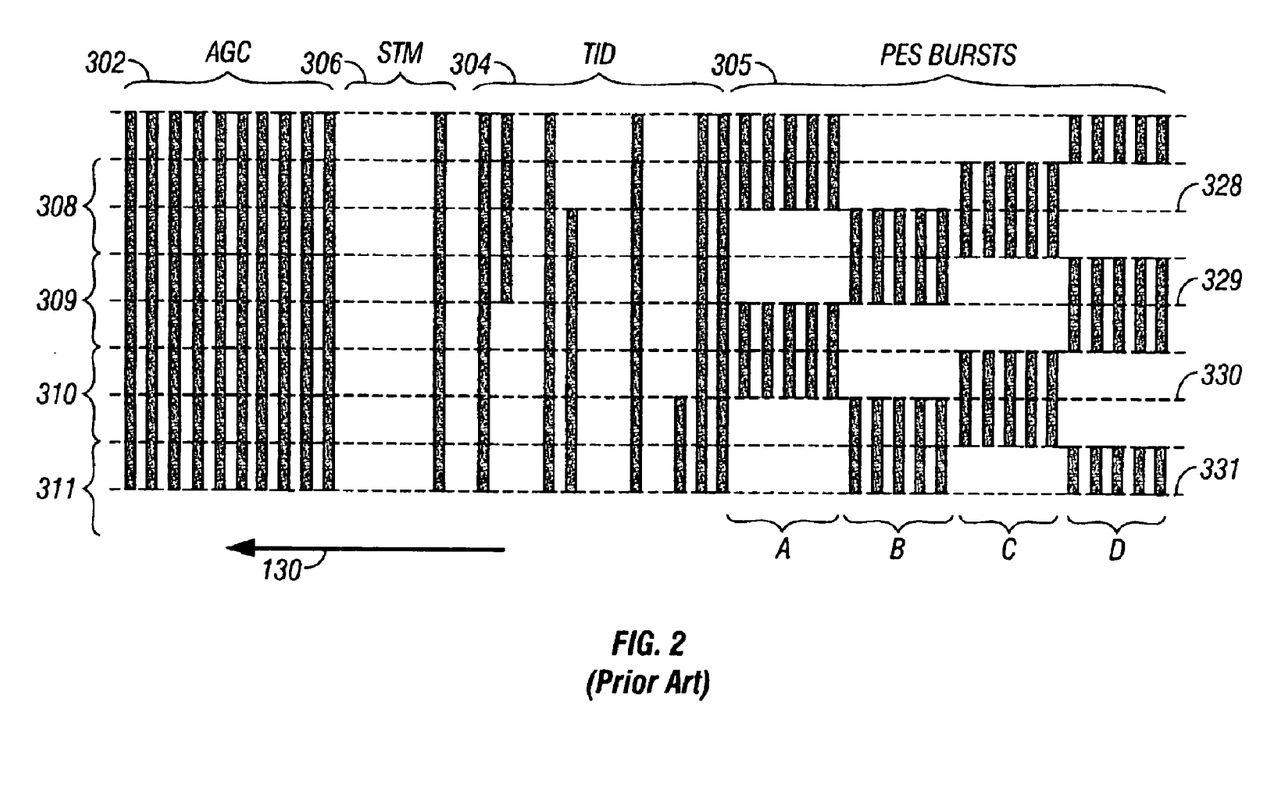
FIG. 2 is a view of a prior art servo pattern in the servo sectors of four adjacent tracks and shows a quad-burst position error signal (PES) pattern.

FIG. 2 is a schematic of a conventional servo pattern of the type commonly used in sector servo systems and shows a greatly simplified pattern for clarity with several tracks in one of the servo sections 120 (full tracks 308, 309, 310 and half-track 311, each having a respective track centerline 328, 329, 330 and 331). The servo pattern moves relative to head 109 in the direction shown by arrow 130. The two possible magnetic states of the medium are indicated as black and white regions. The servo pattern is comprised of four distinct fields: automatic gain control (AGC) field 302, servo-timing-mark (STM) field 306, track ID (TID) field 304 and position-error-signal (PES) field 305 depicted as the well-known quad-burst pattern of bursts A–D.

The AGC field 302 is a regular series of transitions and is nominally the same at all radial positions. The AGC field 302 allows the servo control processor 115 to calibrate timing and gain parameters for later fields.

The servo timing mark (STM) field 306 serves as a timing reference for reading the subsequent servo information in track identification (TID) field 304 and position error signal (PES) field 305. The STM is also referred to as a servo address mark or servo start mark.

The TID field 304 contains the track number, usually Gray-coded and written as the presence or absence of recorded dibits. The TID field 304 determines the integer part of the radial position of head 109.

The position error signal (PES) field 305 contains PES bursts A–D that are used to determine the fractional part of the radial position of the head. Each PES burst comprises a series of regularly spaced magnetic transitions. The PES bursts are arranged radially such that a burst of transitions are one track wide and two tracks apart, from centerline to centerline. The A and B bursts are the main bursts because when the head is at the track centers the read-back signal amplitudes from A and B are equal. When the head is at the half-track positions the amplitudes from C and D are equal. The PES bursts are offset from their neighbors such that when the head is centered over an even-numbered track (e.g., track 310 with centerline 330) the read-back signal from bursts A and B are equal. As the head moves off-track in a direction toward track 309, for example, the read-back signal from burst A increases and the read-back signal from burst B decreases until, with the head half-way between track centerlines 330 and 329 the read-back signals from bursts C and D are equal, the read-back signal from burst A is maximized and the read-back signal from burst B is minimized. As the head continues to move in the same direction the read-back signal from burst B increases and the read-back signal from burst A decreases until, with the head centered over the next track (with centerline 329) the read-back signal from burst C is minimized, the read-back signal from burst D is maximized and the read-back from signals from bursts A and B are again equal.

The servo information in the pattern of FIG. 2 is read by the read/write electronics 113 (FIG. 1), and signals are input to the servo electronics 112. The servo electronics 112 provides digital signals to servo control processor 115. The servo control processor 115 provides an output 191 to VCM driver 192 that controls current to the VCM 110 to position the head 109.

Within the servo electronics 112, the STM decoder 160 receives a clocked data stream from the read/write electronics 113. Once an STM has been detected, an STM found signal is generated. The STM found signal is used to adjust timing circuit 170, which controls the operating sequence for the remainder of the servo sector.

After detection of an STM, the track identification (TID) decoder 180 receives timing information from timing circuit 170, reads the clocked data stream, which is typically Gray-code encoded, and then passes the decoded TID information to servo control processor 115. Subsequently, the PES decoder 190 (also called the servo demodulator) captures the position information from read/write electronics 113 and passes a position error signal (PES) to servo control processor 115.

The servo control processor 115 includes a microprocessor 117 that uses the PES as input to a control algorithm to generate the control signal 191 to VCM driver 192. The control algorithm recalls from memory a "controller" 116, which is a set of parameters based on the static and dynamic characteristics of the "plant" being controlled, i.e., the VCM 110. The controller 116 is a "single-stage" controller because the disk drive being described has only a primary actuator, i.e., VCM 110, and servo control processor 115 provides only a single output, i.e., signal 191 to VCM driver 192. The control algorithm is essentially a matrix multiplication algorithm, and the parameters are coefficients used in the multiplication and stored in memory accessible by the microprocessor 117.

Figure 3:
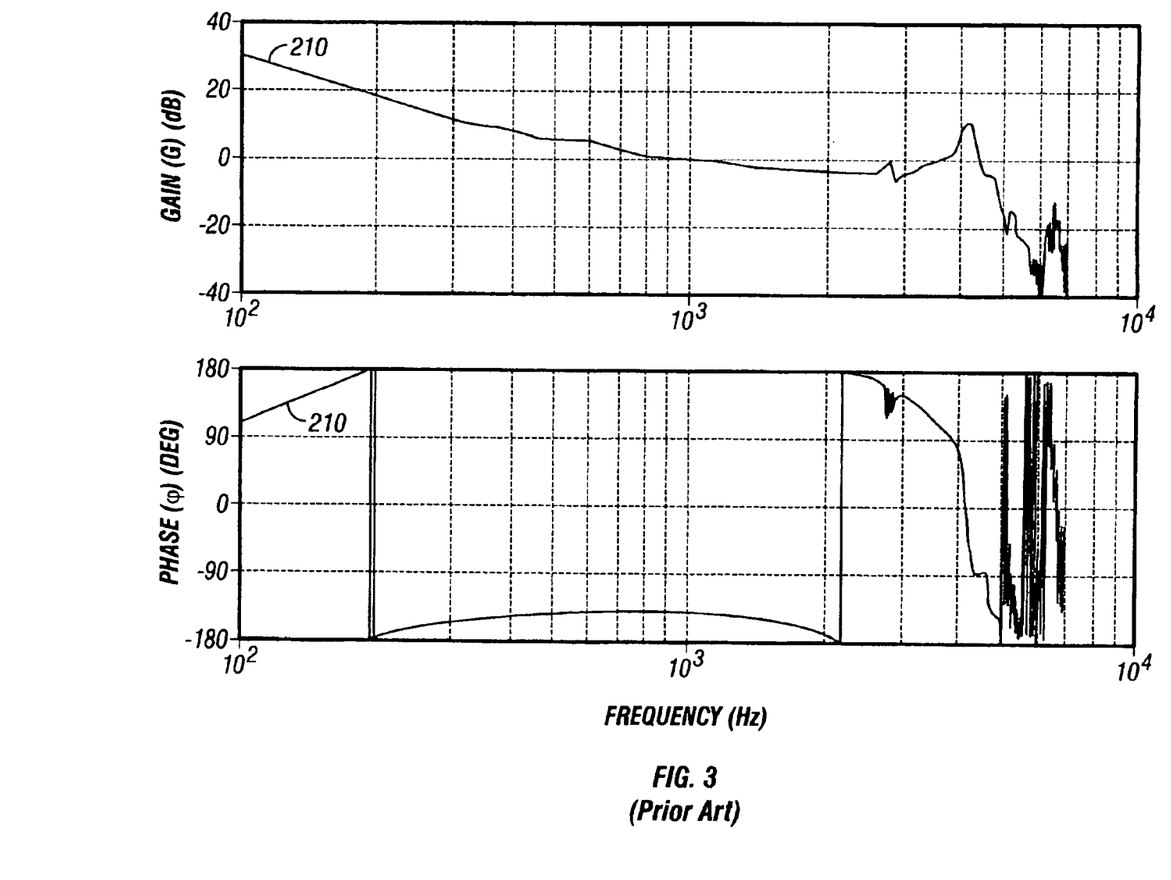
FIG. 3 is an open-loop frequency response for a prior art disk drive with only a single-stage actuator, typically a voice-coil-motor (VCM).

The method of designing the controller 116 is well-known in the digital servo control and disk drive servo control literature. The controller can be designed from the open-loop input-output frequency response of the VCM 110. The input-output behavior of a dynamic system at any frequency can generally be expressed by two parameters, the gain (G) and the phase ($\phi$) representing the amount of attenuation/magnification and phase-shift, respectively. The gain and phase of a dynamic system represent the frequency response of the system and can be generated by experiment. In disk drive single-stage servo control systems the controller 116 must be a stable design. FIG. 3 is an example of an open-loop frequency response 210 for a disk drive with only a single-stage actuator, i.e., VCM 110. The single-stage controller 116 for this system assures stability. For example, at the gain zero-crossover, the phase margin is about 30 degrees and at −180 degree phase the gain margin is about 5 dB. Also, at a natural resonance near 4 kHz, the phase is near zero such that the system is phase stable.

Figure 4:
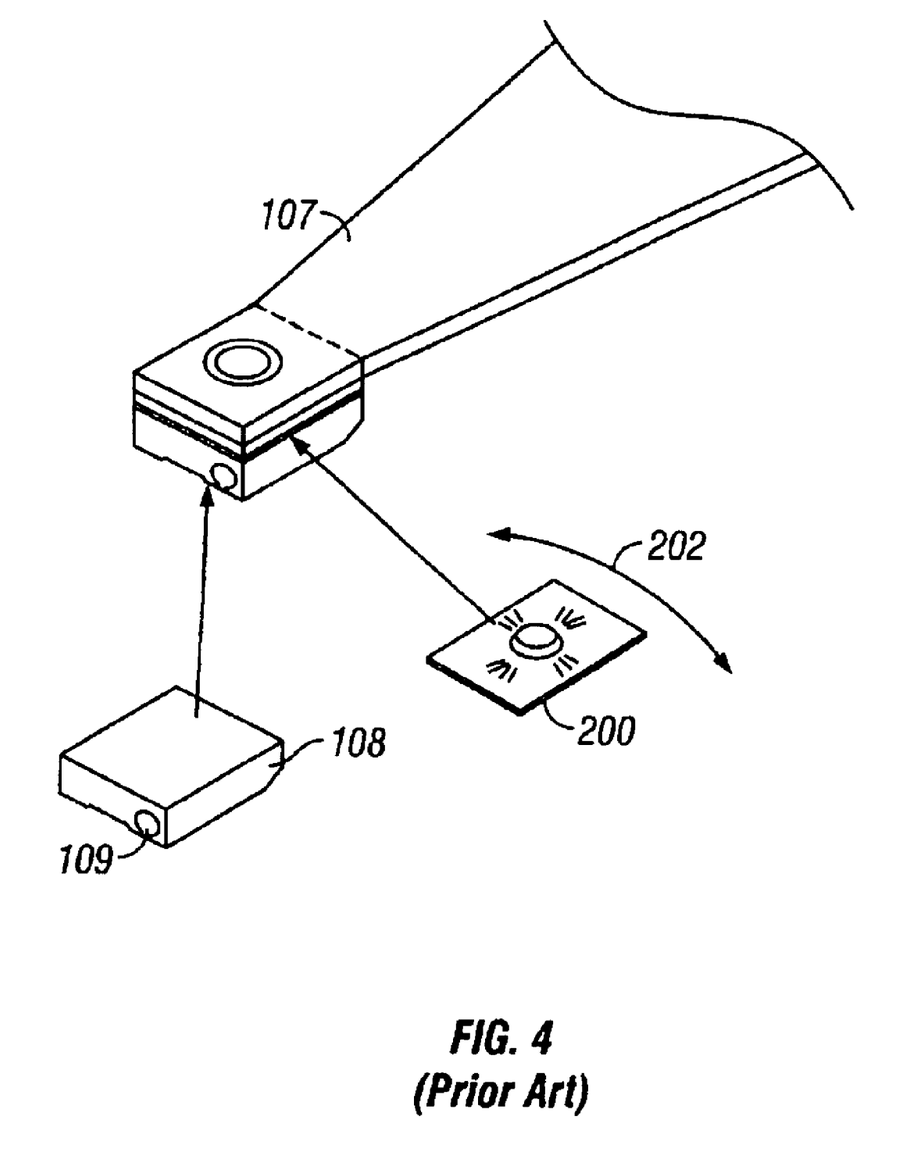
FIG. 4 is a view of a secondary actuator usable with the above-described prior art disk drive.

FIG. 4 shows one example of a secondary actuator usable with the above-described disk drive. The secondary actuator is an electrostatic rotary microactuator 200 located between the slider 118 and the suspension 107. This type of microactuator is described in detail in U.S. Pat. No. 5,959,808 and L. S. Fan et al., "Electrostatic Microactuator and Design Considerations for HDD Applications", *IEEE Transactions on Magnetics*, Vol. 35, No. 2, March 1999, pp. 1000–1005. Rotation of the microactuator 200 as represented by arrow 202 causes rotation of the slider 108 and thus movement of head 109 in the cross-track direction. The microactuator 200 maintains the head 109 on-track, while the VCM 110 moves the slider 108 (and thus head 109) across the tracks. Other types of secondary actuators are also well-known, such as piezoelectric-based actuators. Also, the secondary actuator may be located on the suspension or actuator arm to move a suspension or arm-section relative to the fixed actuator arm, as in U.S. Pat. No. 5,936,805, or between the slider and a slider-segment to move the head relative to the slider, as in U.S. Pat. No. 6,611,399.

Figure 5:
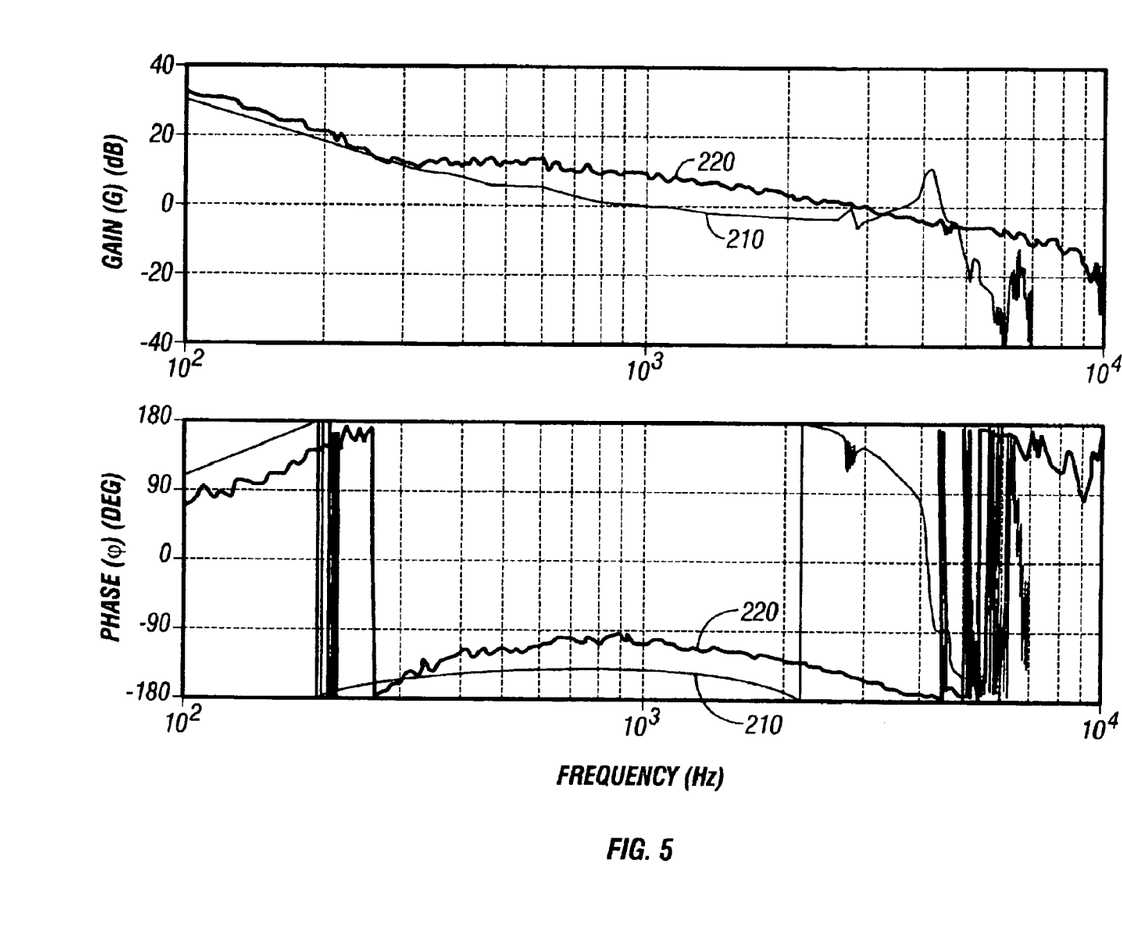
FIG. 5 is a comparison of an open-loop frequency response for a prior art disk drive with a dual-stage actuator with a stable VCM controller design and the open-loop frequency response of FIG. 3.

The control system for a disk drive with dual-stage actuators is similar to that described above except that there is a second output from the servo control processor that is sent to the driver for the secondary actuator, and the controller is a dual-stage controller. In the dual-stage control system, the VCM or primary actuator is typically responsible for large-amplitude, low-frequency motion and the microactuator or secondary actuator is typically responsible for small-amplitude, high-frequency motion. The design of a dual-stage controller for a hard disk drive dual-stage servo control systems is well-known, as described for example, in Y. Lou et al., "Dual-Stage Servo With On-Slider PZT Microactuator for Hard Disk Drives", *IEEE Transactions on Magnetics*, Vol. 38, No. 5, September 2002, pp. 2183–2185; and T. Semba et al., "Dual-stage servo controller for HDD using MEMS microactuator", *IEEE Transactions on Magnetics*, Vol. 35, September 1999, pp. 2271–2273. Generally, the design of a dual-stage controller starts with the VCM controller, typically with a design that is very similar to a single-stage VCM controller, such as the design for the VCM controller whose open-loop frequency response 210 is shown in FIG. 3. In particular, the stability of the VCM is assured with adequate robustness or stability margins as if it were to operate without the secondary actuator. Then the controller for the secondary actuator is designed to achieve the desired combined dual-stage bandwidth. The secondary actuator control loop and the combined dual-stage control loop are also designed to ensure adequate stability separately and jointly with the other control loops. This process is satisfactory for limited increases in the bandwidth above what is achievable with only the VCM. An example of an open-loop frequency response for a dual-stage hard disk drive with a stable VCM controller design is shown as frequency response 220 in FIG. 5 and compared with the frequency response 210, which is also shown FIG. 3. The response 220 is similar to response 210 at low frequencies, but has higher gain in the mid-frequency range, and a higher bandwidth. For disk drives in general and for the frequency responses described herein, the low frequency range is generally meant to be below approximately 300 Hz, the mid frequency range is generally meant to be approximately 300 Hz to 2 kHz, and the high frequency range is generally meant to be above approximately 2 kHz. However, the boundaries between what are considered low, mid, and high frequency ranges are more accurately linked to where the microactuator begins to dominate the overall frequency response and the open loop bandwidth (0 dB crossover) achievable with a single-stage actuator. This is strongly related to the physical size of the disk drive.

THE INVENTION

Figure 6:
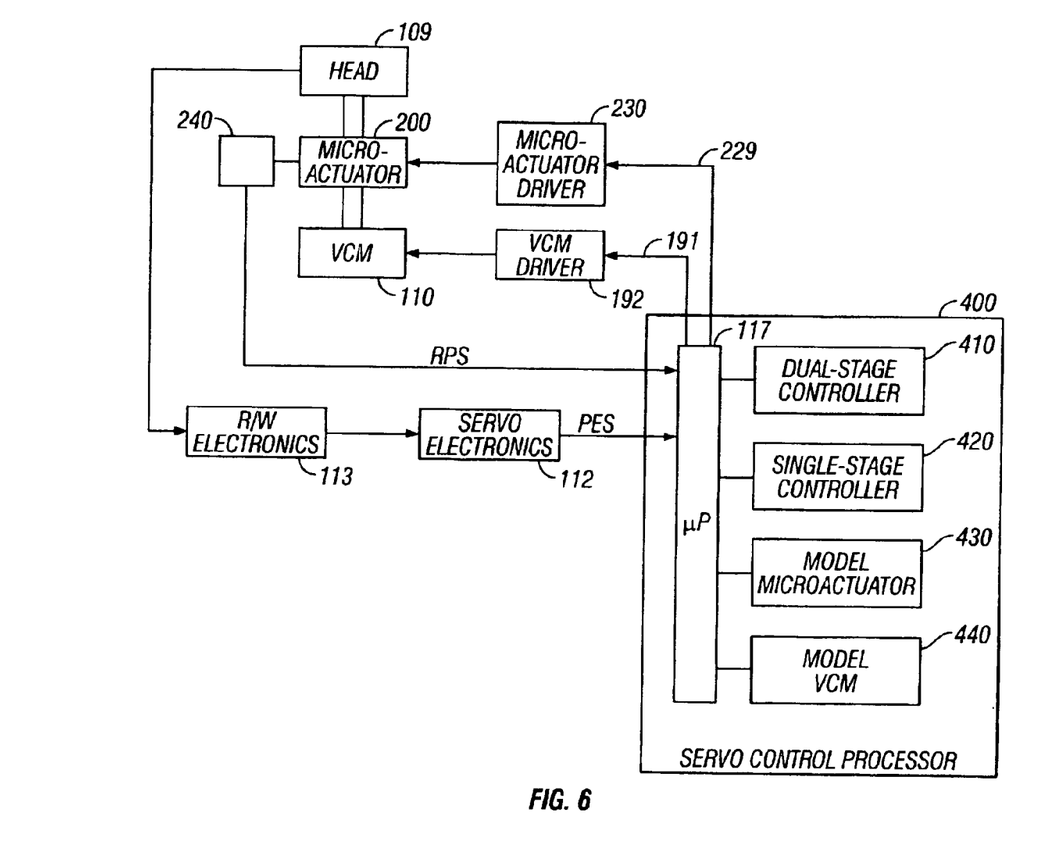
FIG. 6 is a block diagram of disk drive with a dual-stage actuator and control system according to the present invention.

FIG. 6 is a block diagram of the control system of the present invention for a dual-stage hard disk drive. The head 109 reads the servo pattern from the disk, the read/write electronics 113 processes the signal from the head 109, and the servo electronics 112 generates the PES from the signals from read/write electronics 113, all as described in the prior art.

The servo control processor 400 receives the PES from servo electronics 112, and provides a primary control signal 191 to VCM driver 192 and a secondary control signal 229 to microactuator driver 230. The servo control processor includes a microprocessor 117 and uses a dual-stage controller 410 to generate control signals 191, 229. The dual-stage controller 410 incorporates a degraded-stability VCM controller with relatively high low-frequency open-loop gain, and a secondary actuator controller providing stability to the dual-stage controller and high mid-to-high-frequency open-loop gain, resulting in increased bandwidth. However, if the microactuator 200 fails while the disk drive is under the control of dual-stage controller 410, then VCM 110 will become unstable. If the microactuator 200 fails then the servo control processor 400 switches to use of a single-stage stable controller 420 and generates only a primary control signal 191 to VCM driver 192. The single-stage controller 420 can be a VCM controller based on the frequency response 210 (FIG. 3) or any VCM controller that is stable without the microactuator 200. This stable VCM controller 420 will most likely have decreased performance, but will prevent catastrophic failure of the disk drive that would result in loss of data.

In the preferred embodiment, the detection of microactuator 200 failure is by a microactuator relative-position sensor 240. The sensor 240 measures the displacement of microactuator 200 relative to VCM 110 and provides a relative-position signal (RPS) to servo control processor 400. If the secondary actuator is an electrostatic microactuator, then sensor 240 can be a capacitance sensing circuit, as described in M. T. White et al., "Use of the Relative Position Signal for Microactuators in Hard Disk Drives", *Proceedings of the American Control Conference*, Denver, Colo., Jun. 4–6, 2003, pp. 2535–2540.

Figure 7:
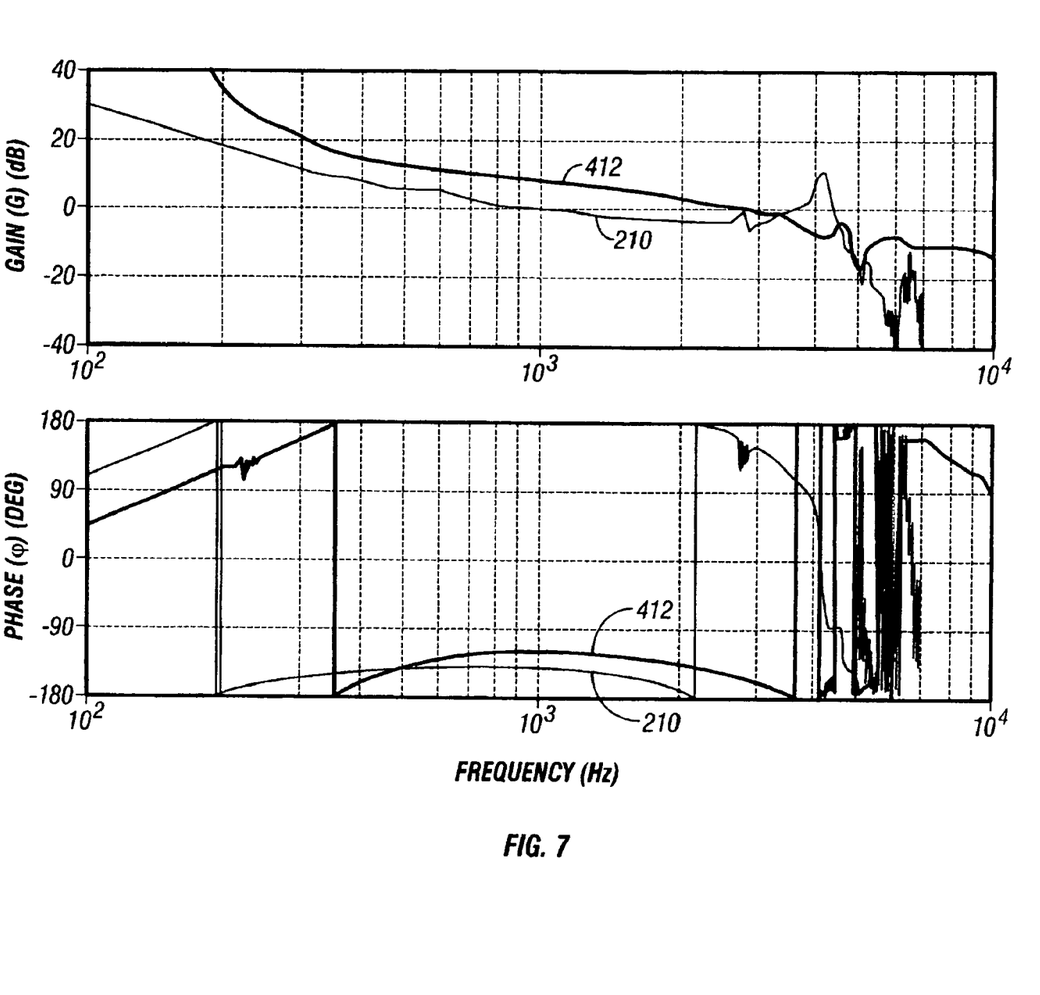
FIG. 7 is a comparison of the open-loop frequency response for the dual-stage controller with a degraded-stability VCM controller design according to the present invention and the open-loop frequency response of FIG. 3.

FIG. 7 is the open-loop frequency response 412 for the dual-stage controller 410 with a degraded-stability VCM controller design compared with the frequency response 210 for the single-stage stable controller 420. As frequency response 412 shows, the low frequency gain may be increased by relaxing the stability requirements of the VCM, but at the expense of robustness. The resulting open-loop frequency response of the dual-stage system 412 has increased gain over a wider frequency compared to the open-loop frequency response of the dual-stage system 220 shown in FIG. 5. This will result in better disturbance rejection and performance. The frequency response of the dual-stage system 412 has gain and phase margins that are comparable to the frequency response of the single-stage system 210 in FIG. 3. The phase margin near 2.8 kHz is about 30 degrees and the gain margin near 3.8 kHz is about 5 dB.

Figure 8:
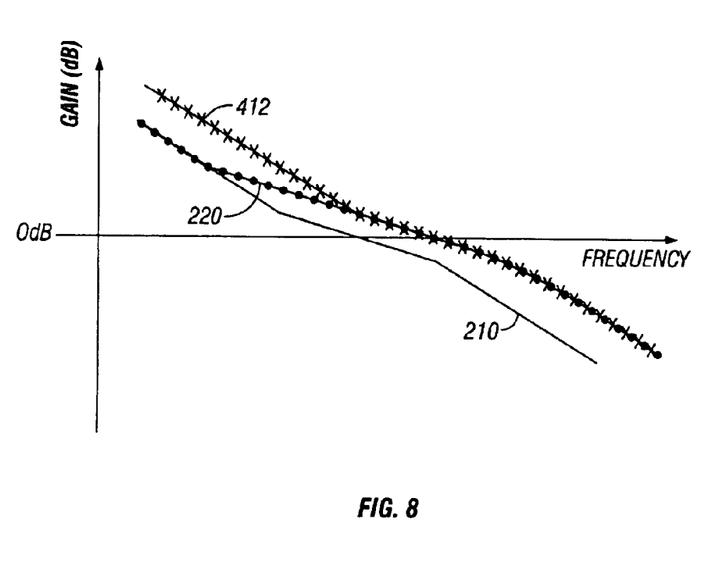
FIG. 8 shows the gain of the VCM open-loop frequency response for a stable single-stage VCM controller, the gain improvement with the addition of a secondary actuator, and the further gain improvement with the use of an increased-gain degraded-stability VCM controller and a secondary actuator.

FIG. 8 is the gain portion of three frequency responses and is a graphical explanation of the invention. Solid line 210 represents the gain of the VCM open-loop frequency response for a stable single-stage VCM controller. Dotted line 220 represents the improvement to response 210 with the addition of the secondary actuator (microactuator 200) and is the typical shape for a conventional dual-stage controller. It has increased bandwidth and increased gain in the mid-frequency range. This will result in improved disturbance rejection and faster response at these frequencies. However, because the low-frequency gain is still determined by the single-stage VCM controller, there is no improvement at low frequency. Cross-hatched line 412 represents the further improvement with the use of an increased-gain degraded-stability VCM controller and the secondary actuator. This response also has increased low-frequency gain, and is comparable in shape to the response for the VCM-only design, but shifted higher in frequency. However, increasing the low-frequency gain will also decrease the phase margin for the VCM controller, potentially to the point of instability of the VCM. The secondary actuator controller is then designed to make the combined system stable, as well as increasing the mid-frequency to high-frequency gain. Using the secondary actuator to ensure the stability of the combined system typically takes significantly less stroke than using the secondary actuator to increase the low-frequency gain, and is therefore a more efficient use of the limited secondary actuator stroke to achieve high bandwidth with adequate disturbance rejection. However, with the dual-stage controller represented by line 412, failure of the secondary actuator results in an unstable system. This could lead to inoperability of the hard disk drive, or even failure with loss of data In the present invention, this is avoided by detecting a potential failure of the secondary actuator, confirming the inoperability of the secondary actuator, and switching to a stable VCM-only controller.

Figure 9:
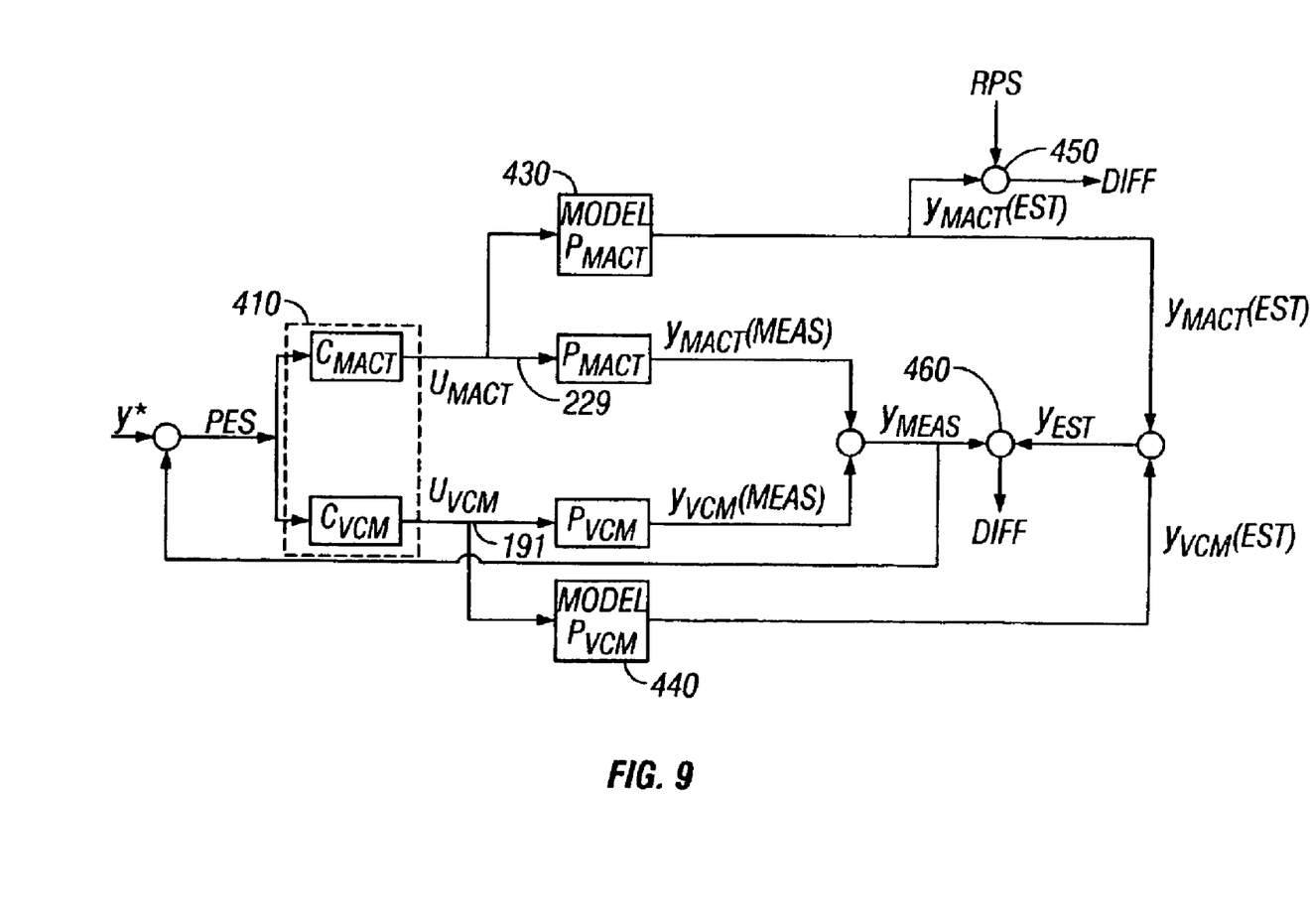
FIG. 9 is a schematic structure of the control system of the present invention.

A schematic structure of the control system of the present invention is shown in FIG. 9. $C_{MACT}$ and $P_{MACT}$ represent the microactuator controller and plant, respectively, and $C_{VCM}$ and $P_{VCM}$ represent the VCM controller and plant, respectively. The controllers $C_{MACT}$ and $C_{VCM}$ together represent the dual-stage controller 410. The microprocessor 117 in servo control processor 400 (FIG. 6) runs the control algorithm using the parameters of controllers $C_{MACT}$ and $C_{VCM}$ and generates control signals $u_{MACT}$ and $u_{VCM}$ (229 and 191, respectively, in FIG. 6). The control system includes a model 430 of the microactuator plant and a model 440 of the VCM plant. These models may be determined from frequency response measurements of the microactuator and VCM, finite element models (FEM), or other well-known system identification techniques.

FIG. 9 shows two methods for determining failure of the microactuator 200. In the preferred method the calculated microactuator control signal $u_{MACT}$ is input to the microactuator model 430 and the estimated microactuator position $y_{MACT(EST)}$ from the model is compared to the RPS from sensor 240 at junction 450. In an alternative "PES-based" method the calculated microactuator control signal $u_{MACT}$ is input to the microactuator model 430 and the calculated VCM control signal $u_{VCM}$ is input to the VCM model 440. The modeled expected or estimated output $y_{EST}$ then compared with the measured output $y_{MEAS}$ at junction 460.

Figure 10:
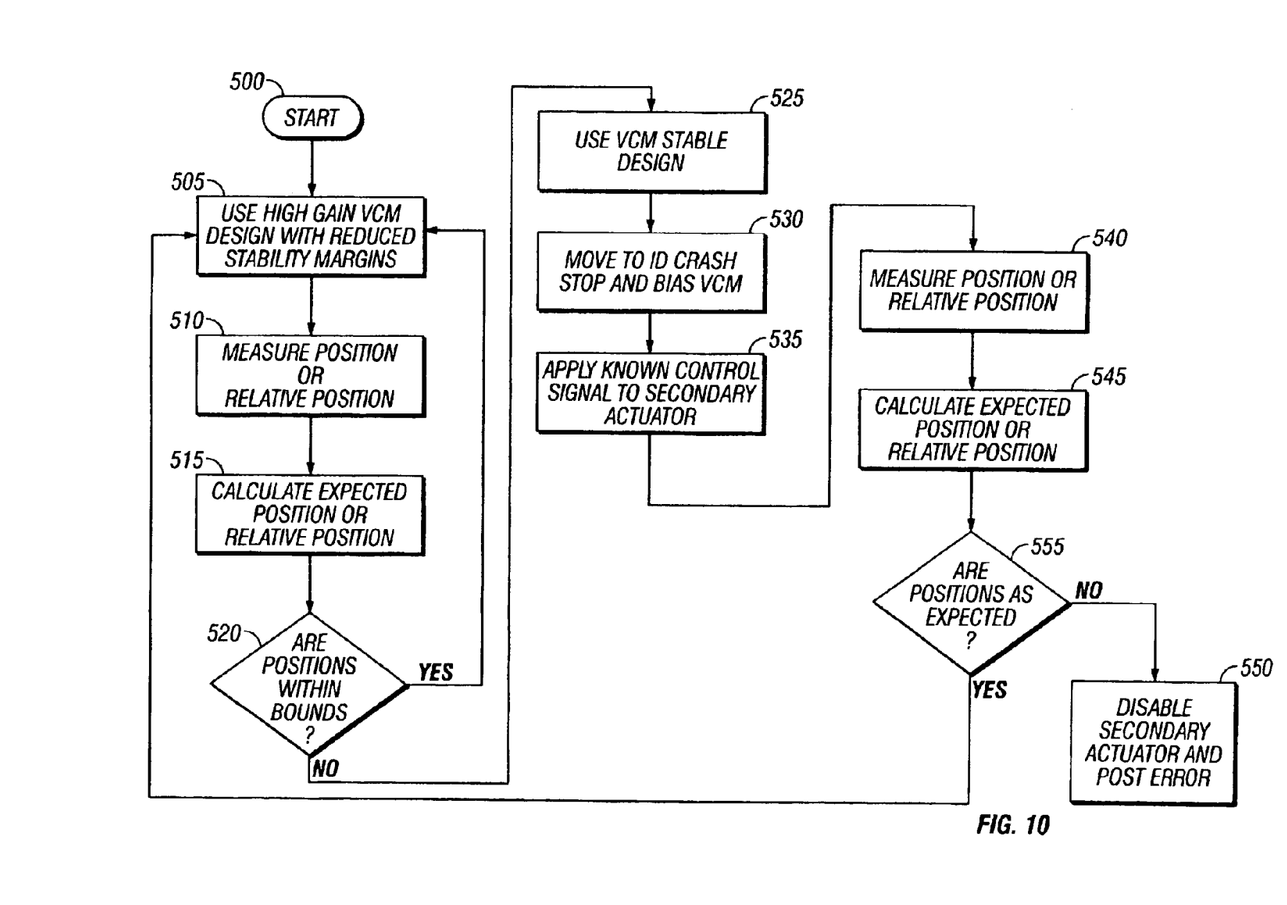
FIG. 10 is a flow chart for the operation of the disk drive of the present invention.

FIG. 10 is a flow chart for the operation of the disk drive of the present invention. The control system starts (block 500) and continues to operate using the dual-stage controller 410 with the degraded-stability VCM controller (block 505). In block 510, the position of the head is measured ($y_{MEAS}$) if the PES-based method is used, or the relative position of microactuator 200 is measured (RPS) if the relative position sensing method is used. In block 515 the expected or estimated head position $Y_{EST}$ is calculated from the models 430, 440 if the PES-based method is used, and the expected or estimated relative position ($y_{MACT(EST)}$) is calculated from microactuator model 430 if the relative position sensing method is used. The difference (DIFF) is then tested to see if it is within predetermined bounds (block 520). If yes, the control continues (block 505).

If DIFF is outside the bounds, this indicates potential failure of the microactuator 200. Once a potential failure of the secondary actuator has been detected the servo control processor 400 recalls the stable VCM controller 420 (FIG. 6) from memory (block 525). The head is then moved to the far inner diameter of the disk so that the VCM compresses the crash stop 103, and the VCM 110 is then biased so that it maintains its position at the inner diameter with the crash stop compressed (block 530). In this way, the position of the VCM is essentially fixed. With the position of the VCM 110 biased against the crash stop, an excitation control signal is applied to the microactuator 200 (block 535) to determine if it is moving. Using a technique similar to the failure detection techniques listed above, the actual measured position or relative position of the head (block 540) is compared to the expected motion of the head (block 545). Because the VCM is biased against the crash stop, the effects of other sources of error are virtually eliminated. This is a safe and accurate way to determine the motion of the microactuator in a condition that is virtually isolated from the VCM. If the measured motion of the head is as expected (block 555), control returns to block 505.

If the measured motion of the head does not match the expected motion, it is virtually assured that the microactuator has failed and that the disk drive should not be operated with controller 410 that has the degraded-stability VCM controller. In the case of a confirmed failure of the microactuator, the stable VCM-only controller 420 is recalled from memory and the microactuator is disabled (block 550). In the case of a confirmed failure of the microactuator, an error flag can be set and the stable VCM-only design can be used exclusively until repairs to the disk drive can be made. Without the microactuator, the disk drive can operate, but likely at a significantly lower performance level.

As an additional feature, if the positions are as expected after the control signal is applied to the VCM against the crash stop (block 555), a counter counts the number of times this occurs. If this count exceeds a certain threshold within a certain time period, an error is posted and the secondary actuator is disabled (block 550). By counting the number of times the VCM has been moved to the crash stop as a result of a failure of the microactuator, the disk drive can continue to operate with intermittent failures of the microactuator but the microactuator will be permanently disabled when these failures become too frequent.

The same controller structure can be used for the stable VCM-only design as the dual-stage design, with only a change of parameters required. Currently, many disk drives use a form of mode switching control. Depending upon the mode that the disk drive is in (e.g., a long seek, a short seek, settling on track, or track following), the servo control processor can recall different controllers from memory. Thus, the stable VCM-only controller can be defined as an additional mode, and can be efficiently integrated into the current disk drive controller scheme.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A disk drive having a rotatable magnetic recording disk with a plurality of concentric tracks and a recording head movable across the disk for reading and/or writing data in the tracks, and wherein the tracks contain servo information detectable by the head, the disk drive comprising:
   a primary actuator for moving the head;
   a secondary actuator connected to the primary actuator, the head being connected to the secondary actuator;
   a servo control processor responsive to servo information detected by the head, the servo control processor comprising a dual-stage controller for simultaneously generating a primary actuator control signal and a secondary actuator control signal, and a single-stage controller for generating only a primary actuator control signal, said single-stage controller being selectable by the processor in response to failure of the secondary actuator.

2. The disk drive of claim 1 wherein the dual-stage controller comprises a degraded-stability primary actuator controller having relatively high low-frequency open-loop gain, and a secondary actuator controller providing stability to the dual-stage controller.

3. The disk drive of claim 2 wherein the servo control processor includes a model of the dynamic response of the primary actuator and a model of the dynamic response of the secondary actuator, the models providing a modeled head-position output when the controls signals from the dual-stage controller are input to the models.

4. The disk drive of claim 3 wherein the single-mode controller is selectable by the processor when the difference between the modeled head-position output and the measured head position from the servo information detected by the head is greater than a predetermined value.

5. The disk drive of claim 3 further comprising a secondary-actuator relative-position sensor coupled to the servo control processor.

6. The disk drive of claim 5 wherein the secondary-actuator model provides a modeled output of the position of the secondary actuator relative to the primary actuator when the secondary actuator control signal from the dual-mode controller is input to the secondary-actuator model, and wherein the single-mode controller is selectable by the processor when the difference between the modeled secondary-actuator relative position and the measured relative secondary-actuator position from the relative-position sensor is greater than a predetermined value.

7. The disk drive of claim 5 wherein the secondary actuator is an electrostatic microactuator and the relative-position sensor includes a capacitance sensing circuit coupled to the microactuator.

8. The disk drive of claim 1 wherein the secondary actuator is a piezoelectric actuator.

9. A disk drive having a rotatable magnetic recording disk with a plurality of concentric tracks and a recording head movable across the disk for reading and/or writing data in the tracks, and wherein the tracks contain servo information detectable by the head, the disk drive comprising:
   a voice-coil-motor (VCM) for moving the head;
   a crash stop for limiting movement of the VCM;
   a microactuator connected to the VCM, the head being connected to the microactuator;
   a servo control processor responsive to servo information detected by the head, the servo control processor comprising a dual-stage controller having a degraded-stability VCM controller with relatively high low-frequency gain and a microactuator controller for simultaneously generating a VCM control signal and a microactuator control signal, and a single-stage controller for generating only a VCM control signal, said single-stage controller being selectable by the processor in response to failure of the microactuator.

10. The disk drive of claim 9 wherein the servo control processor includes a model of the dynamic response of the VCM and a model of the dynamic response of the microactuator, the models providing a modeled head-position output when the controls signals from the dual-stage controller are input to the models.

11. The disk drive of claim 10 wherein the single-stage controller is selectable by the processor when the difference between the modeled head-position output and the measured head position from the servo information detected by the head is greater than a predetermined value.

12. The disk drive of claim 11 wherein, if the single-stage controller is selected and the VCM is biased against the crash stop, the dual-stage controller is selectable by the processor when the difference between the modeled head-position output and the measured head position from the servo information detected by the head is less than a predetermined value.

13. The disk drive of claim 10 further comprising a microactuator relative-position sensor coupled to the servo control processor.

14. The disk drive of claim 13 wherein the microactuator model provides a modeled output of the position of the microactuator relative to the VCM when the microactuator control signal from the dual-stage controller is input to the microactuator model, and wherein the single-stage controller is selectable by the processor when the difference between the modeled microactuator relative position and the measured relative microactuator position from the relative-position sensor is greater than a predetermined value.

15. The disk drive of claim 14 wherein, if the single-stage controller is selected and the VCM is biased against the crash stop, the dual-stage controller is selectable by the processor when the difference between the modeled microactuator relative position and the measured relative microactuator position from the relative-position sensor is less than a predetermined value.

16. The disk drive of claim 13 wherein the microactuator is an electrostatic microactuator and the relative-position sensor includes a capacitance sensing circuit coupled to the microactuator.

17. The disk drive of claim 9 wherein the microactuator is a piezoelectric microactuator.

18. The disk drive of claim 9 wherein, following selection of the single-stage controller in response to failure of the microactuator, the control signal to the VCM from the single-stage controller moves the VCM to the crash stop.

19. The disk drive of claim 18 wherein, with the VCM biased against the crash stop and an excitation control signal applied to the microactuator, the single-stage controller remains selected if the microactuator has failed.

20. The disk drive of claim 18 wherein the single-stage controller is permanently selected if the VCM is moved to the crash stop more than a predetermined number of times within a predetermined time period.

* * * * *